United States Patent
Schuele et al.

(10) Patent No.: US 11,021,091 B2
(45) Date of Patent: Jun. 1, 2021

(54) SIDE MEMBER FOR A VEHICLE SEAT, VEHICLE SEAT

(71) Applicant: Adient Engineering and IP GmbH, Burscheid (DE)

(72) Inventors: Robert Schuele, Boeblingen (DE); Hans Schmodde, Vaihingen (DE)

(73) Assignee: Adient Engineering and IP GmbH, Burscheid (DE)

( * ) Notice: Subject to any disclaimer, the term of this patent is extended or adjusted under 35 U.S.C. 154(b) by 57 days.

(21) Appl. No.: 16/554,001

(22) Filed: Aug. 28, 2019

(65) Prior Publication Data

US 2020/0070703 A1   Mar. 5, 2020

(30) Foreign Application Priority Data

Aug. 29, 2018  (EP) .................................... 18191387

(51) Int. Cl.
| | | |
|---|---|---|
| *B60N 2/42* | (2006.01) | |
| *B60N 2/90* | (2018.01) | |
| *B60N 2/02* | (2006.01) | |
| *F03G 7/06* | (2006.01) | |
| *B60N 2/64* | (2006.01) | |

(52) U.S. Cl.
CPC .......... *B60N 2/986* (2018.02); *B60N 2/0224* (2013.01); *B60N 2/64* (2013.01); *B60N 2/919* (2018.02); *F03G 7/065* (2013.01); *B60N 2/914* (2018.02); *B60N 2/99* (2018.02); *B60N 2002/924* (2018.02)

(58) Field of Classification Search
CPC ........ B60N 2/919; B60N 2/914; B60N 2/986; B60N 2/99; B60N 2/0224
See application file for complete search history.

(56) References Cited

U.S. PATENT DOCUMENTS

| | | | | |
|---|---|---|---|---|
| 7,905,548 | B2 * | 3/2011 | Gupta .................... | B60N 2/986 297/284.9 |
| 9,045,063 | B2 * | 6/2015 | Line ........................ | B60N 2/99 |
| 9,145,073 | B2 * | 9/2015 | Andersson ............. | B60N 2/449 |
| 2009/0218858 | A1 * | 9/2009 | Lawall ..................... | B60N 2/99 297/216.1 |
| 2010/0117412 | A1 * | 5/2010 | Bicker ................... | B60N 2/914 297/217.1 |

FOREIGN PATENT DOCUMENTS

| | | |
|---|---|---|
| DE | 196 05 779 C2 | 7/1996 |
| DE | 102005059081 A1 | 2/2007 |
| DE | 112007000947 B4 | 7/2016 |
| DE | 112009000484 B4 | 11/2016 |
| IE | 199 43 996 A1 | 3/2001 |

* cited by examiner

*Primary Examiner* — Syed A Islam
(74) *Attorney, Agent, or Firm* — Marshall & Melhorn, LLC

(57) ABSTRACT

A side member (10) for a vehicle seat (1), in particular motor vehicle seat, includes a metallic frame section (12). The frame section (12) has an exposed supporting section (14) for supporting a padding of the side member (10), wherein the supporting section (14) is flexurally elastic and, in a normal position, protrudes from the frame section (12) in order to support the padding, wherein at least one electrically controllable actuator (20) is provided, which, by generating a force, transfers the supporting section (14) from the normal position into a retracted position. The invention furthermore relates to a vehicle seat (1) having at least one side member (10).

11 Claims, 2 Drawing Sheets

US 11,021,091 B2

SIDE MEMBER FOR A VEHICLE SEAT, VEHICLE SEAT

CROSS REFERENCE TO RELATED APPLICATIONS

This application claims the benefit of priority under 35 U.S.C. § 119 of European Application 18 191 387.2, filed Aug. 29, 2018, the entire contents of which are incorporated herein by reference.

TECHNICAL FIELD

The invention relates to a side member for a vehicle seat with a metallic frame section, wherein the frame section has an exposed supporting section for supporting a padding of the side member, wherein the supporting section is flexurally elastic and, in a normal position, protrudes from the frame section in order to support the padding.

The invention furthermore relates to a vehicle seat with the side member.

TECHNICAL BACKGROUND

It is known from DE 199 43 996 A1 that, in the case of a vehicle seat, in particular a motor vehicle seat, having at least one pair of side members on the seat part and/or on the backrest, the side members are adjustable automatically.

DE 196 05 779 C2 discloses a vehicle seat which consists of a seat part having adjustable seat members and of a backrest part having adjustable backrest members, wherein the seat members and/or the backrest members as padded member parts are held in a movable manner and are adjustable via a mechanical adjustment device from a wide position lying towards the outer side of the vehicle seat into a narrow position lying towards the center of the vehicle seat.

SUMMARY

An object on which the invention is based is that of improving a side member of the type mentioned at the beginning, in particular of providing the possibilities of a low noise and rapid adjustment of the side member, and of providing a corresponding vehicle seat. In addition, the intention is to provide an electrically operable entry aid.

This object is achieved according to the invention by a side member for a vehicle seat, in particular motor vehicle seat, with a metallic frame section, wherein the frame section has an exposed supporting section for supporting a padding of the side member, wherein the supporting section is flexurally elastic and, in a normal position, protrudes from the frame section in order to support the padding, wherein at least one electrically controllable actuator is provided, in particular for reducing a height of the side member, which, by generating a force, transfers the supporting section from the normal position into a retracted position.

Owing to the fact that at least one electrically controllable actuator is provided, in particular for reducing a height of the side member, which, by generating a force, transfers the supporting section from the normal position into a retracted position, an excess length of the side member in relation to a seat part or a backrest of a vehicle seat can be reduced and adjusted in a simple manner.

The metallic frame section of the side member is preferably manufactured from a metal plate. The supporting section can be manufactured from metal plate, preferably from spring plate, in particular from a plate made of spring steel. The frame section can be manufactured from a thicker metal plate than the supporting section.

The actuator can be an electrically controllable shape memory actuator. Shape memory actuators have the advantage that they permit a very rapid and delay-free shifting operation.

The actuator can have a wire made from a shape memory alloy. The wire preferably has a meandering extent and runs between first deflection points and second deflection points.

The wire can be thermally insulated by means of a protective sheath. The wire can be electrically insulated by means of a protective sheath. A current consumption and temperature generation by the wire can thereby be controlled. If the wire, for example, is energized, it heats up, and very rapidly contracts preferably when a switching temperature of approx. 90° C. is reached. For connection to an earth conductor, the wire is preferably connected at one end in an electrically conductive manner to the frame section or the supporting section and is connectable at the other end to an electrical energy source. A single-sided connection of the wire to the metallic frame section, which is connected as an earth conductor to the vehicle body, advantageously creates the requirement for just a single-wired activating line or supply line in the cable harness of the vehicle seat.

Despite a comparatively very small shortening of the actuator, in particular of a wire of the actuator, within the range of merely 7% to 10%, large forces can nevertheless be generated.

The actuator can be connected to the supporting section such that actuation of the actuator moves the supporting section in the direction of a lower end position.

In the normal position, an upper edge of the supporting section can have a first excess length in the vertical direction from an opposite edge of the frame section. In the retracted position, an upper edge of the supporting section can have a second excess length in the vertical direction from an opposite edge of the frame section. The second excess length is preferably smaller than the first excess length.

This object is furthermore achieved according to the invention by a vehicle seat, in particular motor vehicle seat, having at least one side member according to the description above.

The frame section of the side member can be manufactured integrally in a seat cushion shell of the vehicle seat. Alternatively, the frame section of the side member can be manufactured as a seat part widening means fixable to a seat cushion shell.

The frame section of the side member can be manufactured integrally in a frame of a backrest. Alternatively, the frame section of the side member can be manufactured as a side member module which is fixable to a frame of a backrest.

In order to supply an entry aid function, a controller can be provided, said controller actuating the actuator of the side member facing a vehicle door depending on information about an opening angle or degree of opening of the vehicle door. In particular, the supporting section can be moved into the retracted position when a vehicle door adjacent to the vehicle seat is opened and can be held in the retracted position for as long as the corresponding vehicle door is open.

The invention is explained in more detail below with reference to an advantageous exemplary embodiment which is illustrated in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

A vehicle seat 1 which is illustrated schematically in FIG. 1 will be described below using three spatial directions running perpendicularly to one another. With a vehicle seat 1 installed in the vehicle, a longitudinal direction x runs substantially horizontally and preferably parallel to a vehicle longitudinal direction which corresponds to the customary direction of travel of the vehicle. A transverse direction running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction. With a vehicle seat 1 installed in the vehicle, the vertical direction z runs parallel to the vehicle vertical axis.

The position specifications and direction specification used, such as front, rear, top and bottom, relate to a viewing direction of an occupant seated in the vehicle seat 1 in a normal seat position, with the vehicle seat 1 being installed in the vehicle and being oriented in a use position suitable for passenger transport, with an upright backrest 4 and in the direction of travel, as customary. However, the vehicle seat 1 according to the invention may also be installed in a different orientation, for example transversely with respect to the direction of travel.

Figure 1:
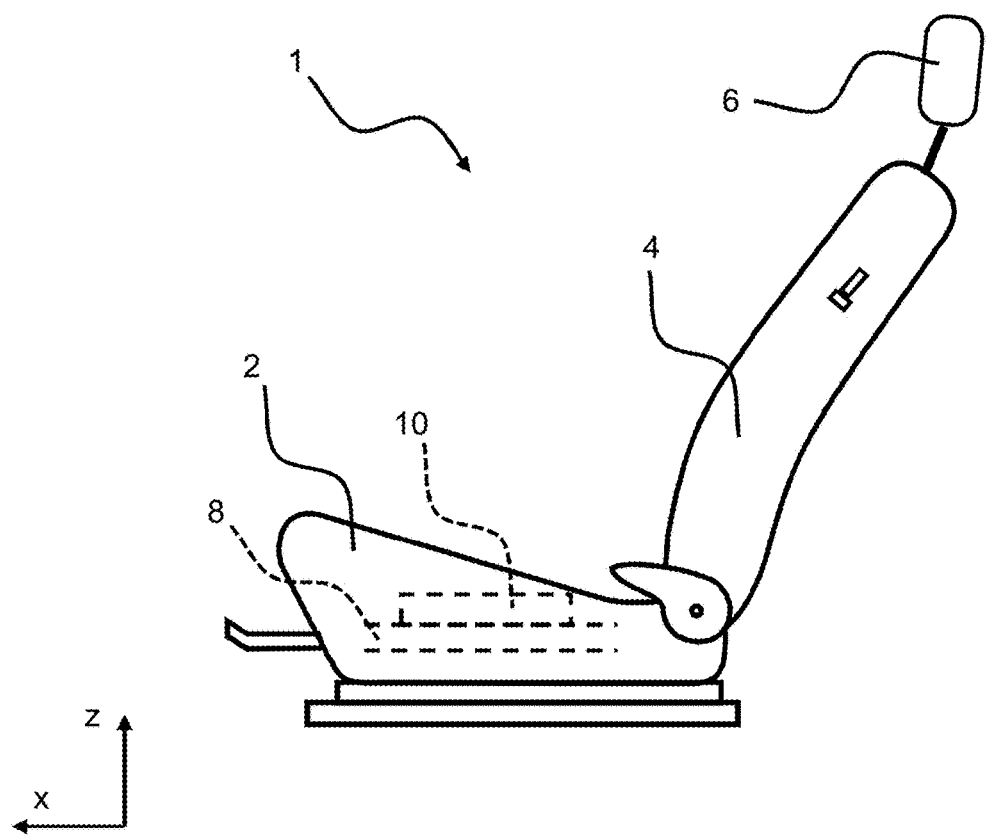
FIG. 1 is a schematic illustration of a vehicle seat.

The vehicle seat 1 shown in FIG. 1, in particular a motor vehicle seat, has a seat part 2 and a backrest 4 which is pivotable in an articulated manner relative to the seat part 2. The backrest 4 has a head restraint 6 at an end facing away from the seat part 2. The seat part 2 has an inner seat cushion shell 8 which serves as a support for a padding of the seat part 2. The vehicle seat 1 has at least one side member 10. The side member 10 is formed integrally in the seat cushion shell 8. However, the side member 10 can likewise be designed as a separately manufactured seat part widening means fixed to the seat cushion shell 8.

The vehicle seat 1 can have a controller for supplying an entry aid function, said controller actuating an actuator 20, described in more detail below, of the side member 10 facing a vehicle door depending on information about an opening angle or degree of opening of the vehicle door. In particular actuating same such that an excess length of the upper edge of the side member 10 over a seat surface is reduced if the vehicle door is opened and an occupant wishes to enter or exit.

Figure 2:
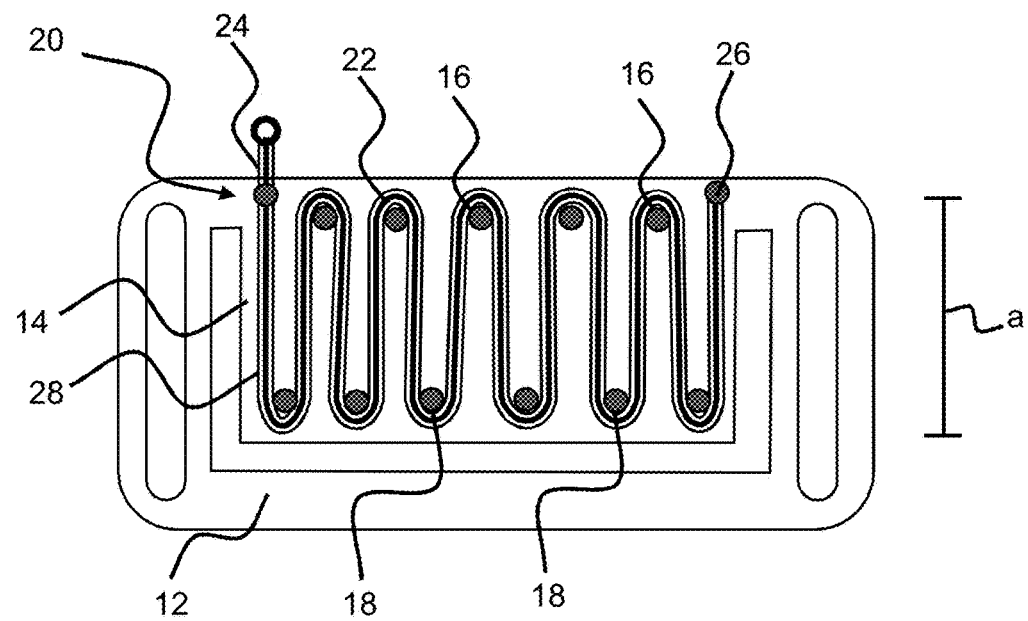
FIG. 2 is a schematic illustration of an actuator arranged on a supporting section.

FIG. 2 shows an actuator 20 which is arranged on a supporting section 14 of a frame section 12 of the side member 10. The actuator 20 is a shape memory actuator. The actuator 20 has a wire 22 made from a shape memory alloy. The wire 22 is arranged on the supporting section 14 running in a meandering manner between first deflection points 16 and second deflection points 18. The first deflection points 16 are arranged at a distance a from the second deflection points 18. The wire 22 is held fixed to the supporting section 14 at least at two wire ends 24, 26. The wire 22 has a protective sheath 28 for thermal insulation and/or for electrical insulation. For connection to an earth conductor, the wire 22 is electrically conductively connected in the region of the second wire end 26 to the metallic supporting section 14. The wire 22 is connectable via the first wire end 44 to an electrical energy source.

Figure 3:
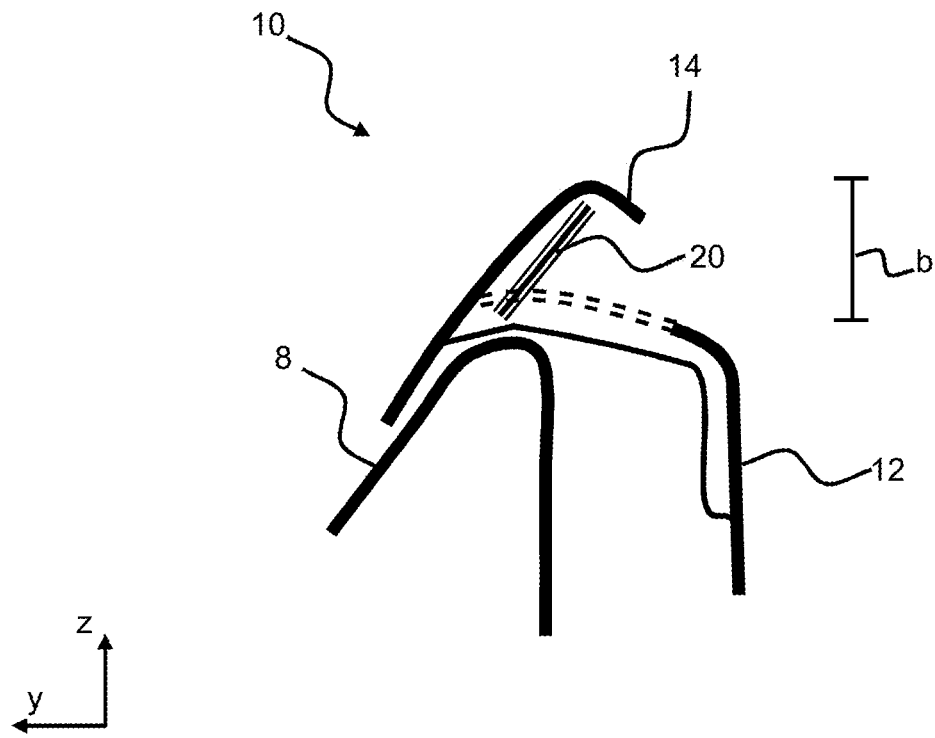
FIG. 3 is a cross sectional view of a side member according to the invention with the supporting section in a normal position.
Figure 4:
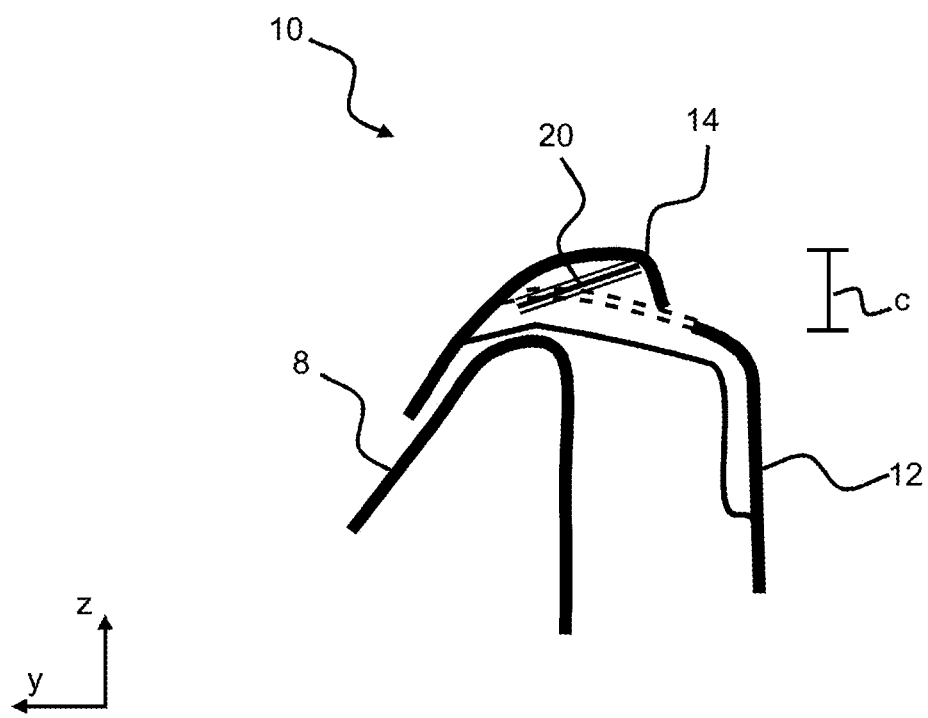
FIG. 4 is a cross sectional view of the side member from FIG. 3 with the supporting section in a retracted position.

FIGS. 3 and 4 each show a cross-sectional view of a side member 10. In the illustration of FIG. 3, the supporting section 14 is in a normal position and, in the illustration in FIG. 4, the supporting section 14 is in a retracted position.

The side member 10 has the metallic frame section 12, wherein the frame section 12 has the exposed supporting section 14 connected thereto for supporting a padding, not illustrated, of the side member 10. The supporting section 14 is flexurally elastic and protrudes from the frame section 12 in order to support the padding. The side member 10 has at least one electrically controllable actuator 20 which, by generating a force, transfers the supporting section 14 from the normal position according to the illustration of FIG. 3 into a retracted position according to the illustration of FIG. 4.

The actuator 20 is arranged lying against the supporting section 14. The actuator 20 is connected to the supporting section 14 such that actuation of the actuator 20 moves the supporting section 14 in the direction of a lower end position. The actuator 20 interacts with the supporting section 14 in the manner of a bi-metal strip. The energizing and resultant heating of the wire 22 causes the wire 22 to contract, as a result of which the supporting section 14 which protrudes from the frame section 12 bends in the direction of the frame section 12. Starting from the normal position, wherein an upper edge of the supporting section 14 has a first excess length b from an opposite edge of the frame section 12, the supporting section 14 is curved in such a manner that, in the protracted position, said supporting section merely still has a second excess length c in relation to the edge of the frame section 12.

The features which are disclosed herein may be of significance both individually and in combination for implementing the invention in its various refinements.

Although the invention has been described in detail in the drawings and the preceding description, the descriptions should be understood as being illustrative and exemplary and not restrictive. In particular, the selection of the graphically illustrated proportions of the individual elements should not be interpreted as being required or restrictive. Furthermore, the invention is in particular not restricted to the exemplary embodiments explained. Further variants of the invention and the implementation thereof are apparent to a person skilled in the art from this disclosure. While specific embodiments of the invention have been shown and described in detail to illustrate the application of the principles of the invention, it will be understood that the invention may be embodied otherwise without departing from such principles.

LIST OF REFERENCE SYMBOLS

1 Vehicle seat
2 Seat part

4 Backrest
6 Head restraint
8 Seat cushion shell
10 Side member
12 Frame section
14 Supporting section
16 First deflection point
18 Second deflection point
20 Actuator
22 Wire
24 First end
26 Second end
28 Protective sheath
a Distance
b First excess length
c Second excess length
x Longitudinal direction
y Transverse direction
z Vertical direction

What is claimed is:

1. A vehicle seat side member comprising:
a metallic frame section;
an exposed supporting section for supporting a padding of the side member, wherein the supporting section is flexurally elastic and, in a normal position, protrudes from the frame section to support the padding; and
an electrically controllable actuator configured to generate a force to transfer the supporting section from the normal position into a retracted position, which is retracted relative to the normal position,
wherein the actuator comprises a shape memory actuator,
wherein the actuator comprises a wire made from a shape memory alloy,
wherein the wire comprises a meandering extent between first deflection points and second deflection points.

2. A vehicle seat side member according to claim 1, wherein the actuator further comprises a protective sheath and the wire is thermally insulated by means of the protective sheath.

3. A vehicle seat side member according to claim 1, wherein, for connection to an earth conductor, the wire is electrically conductively connected at one end to the supporting section and at the other end to an electrical energy source.

4. A vehicle seat side member according to claim 1, wherein the actuator generates a force of 300 to 400 Nm/mm$^2$.

5. A vehicle seat side member according to claim 1, wherein the actuator is connected to the supporting section such that an actuation of the actuator moves the supporting section in a direction of a lower end position.

6. A vehicle seat side member according to claim 1, wherein, in the normal position, an upper edge of the supporting section has a first excess length in a vertical direction from an opposite edge of the frame section.

7. A vehicle seat side member according to claim 6, wherein, in the retracted position, an upper edge of the supporting section has a second excess length (c) in the vertical direction from an opposite edge of the frame section.

8. A vehicle seat comprising a vehicle seat side member, the vehicle seat side member comprising:
a metallic frame section;
an exposed supporting section for supporting a padding of the side member, wherein the supporting section is flexurally elastic and, in a normal position, protrudes from the frame section to support the padding; and
an electrically controllable actuator configured to generate a force to transfer the supporting section from the normal position into a retracted position, which is retracted relative to the normal position,
further comprising a controller for supplying an entry aid function, said controller being configured to actuate the actuator facing the vehicle door depending on information about an opening angle or degree of opening of the vehicle door.

9. A vehicle seat according to claim 8, wherein the frame section of the side member is manufactured integrally in a seat cushion shell.

10. A vehicle seat according to claim 8, further comprising a seat cushion shell, wherein the frame section is manufactured as a seat part widening means fixed to the seat cushion shell.

11. A vehicle seat according to either claim 8, further comprising a backrest frame wherein the frame section is manufactured integrally in the backrest frame.

* * * * *